V. W. Blanchard,
Pinion.

No. 102,363.    Patented Apr. 26, 1870.

Witnesses
H. N. Miller
J. W. White

Inventor
V. W. Blanchard
Per
J. H. Alexander
Atty

United States Patent Office.

VIRGIL W. BLANCHARD, OF BRIDPORT, VERMONT.

Letters Patent No. 102,363, dated April 26, 1870.

IMPROVEMENT IN PINIONS.

The Schedule referred to in these Letters Patent and making part of the same.

*To all whom it may concern:*

Be it known that I, VIRGIL W. BLANCHARD, of the town of Bridport, in the county of Addison and State of Vermont, have invented certain new and useful Improvement in Pinions; and I do hereby declare that the following is a full, clear, and exact description thereof, reference being had to the accompanying drawings and to the letters of reference marked thereon which form a part of this specification.

In order to enable others skilled in the art to make and use the same, I will now proceed to describe its construction and operation, referring to the annexed drawings, in which—

Figure 1:
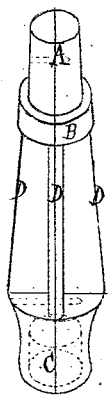
Figure 2:

Figure 1 is a perspective of the pinion, and
Figure 2 is a longitudinal half of the pinion.

A represents the bearing at the small extremity.
B, the flange at the small extremity.
C is the large extremity or head of the pinion, having a circular opening to fit the shaft to which it may be applied.
D D represent the teeth, four in number.

It will be observed that, by longitudinally dividing two of the teeth in their center, one on each side, a pattern is produced for molding a pinion with four teeth, that may be laterally drawn from the sand, which position of the pattern in the sand and direction of draft admits of the flange B and journal or bearing A being attached to its small extremity, which could not be done if the pattern was in one piece and drawn vertically from the sand in molding, which is now the only and usual method of molding pinions.

The circular opening in the head or large extremity C affords a means of attaching the pinion to the shaft to which it is desirable to communicate motion.

A bearing-surface or journal is requisite on the shaft to which the pinion is attached near the point of attachment.

If the shaft to which it is desirable to communicate motion is short, it may be cast solid, with the head or large extremity C, in which case the circular opening would not be necessary.

It will be particularly observed that the shaft to which the pinion is attached does not extend into that section of the pinion that is occupied by the teeth. It will also be observed that the section of the pinion occupied by the teeth D D contains, beside the teeth, only a very small central core of metal, just sufficient to give a firm attachment to the base of the teeth longitudinally, and to join them together.

This core, with the teeth, connects the head or large extremity C with the flange B, and it is to this section that the teeth of the propelling gear are applied.

Now, by bringing the pitch line of the teeth so near the longitudinal central line of the pinion, a strong, durable pinion of four teeth, of very small size, is obtained.

A pinion with the pitch line of its teeth so near the center of the shaft to which it is applied as this must necessarily be, must, of necessity, have a bearing or journal at its small extremity to run smoothly and be durable. This is provided for by means of the flange B and journal or bearing A springing from the same. The center of the journal or bearing A, it will be observed, must be in a line with the center of the shaft to which the pinion is applied.

In the practical operation of this invention the pinion, if its head C is not cast solid with the shaft to which it is desirable to communicate motion, is firmly secured by the circular opening in the head C to said shaft.

This shaft should be provided, near the point of attachment of the pinion, with a bearing-surface or journal. The small extremity A of the pinion should be fitted into a bearing-surface, or journaled on a line with the shaft to which it is attached.

The journal on the shaft, and that on the small extremity of the pinion, should be provided with accurate bearing-surfaces or boxes. Power may then be applied by means of a suitable gear-wheel to the teeth of the pinion, producing a rotary motion in the shaft to which the pinion is applied.

Having thus fully described my invention,
What I claim as new, and desire to secure by Letters Patent, is—

1. Forming a pinion provided at its small extremity with a flange to strengthen the teeth, and with a journal springing from said flange, substantially as and for the purpose set forth.

2. Forming a pinion of four teeth, provided at its small extremity with a journal of greater diameter than its greatest diameter at the pitch line of its teeth, substantially as and for the purposes specified.

3. Forming a pinion having, in the section occupied by the teeth, only the teeth and a central core of metal, of sufficient size to join the teeth longitudinally at their base, substantially as and for the purpose described.

4. The head C and teeth D D, in combination with the flange B and journal A, in a pinion composed of cast metal, substantially as and for the purposes described.

In testimony that I claim the foregoing as my own, I affix my signature in the presence of two witnesses.

VIRGIL W. BLANCHARD.

Witnesses:
N. S. BENNETT,
D. H. BENNETT.